United States Patent [19]
Nicolaus

[11] 3,975,963
[45] Aug. 24, 1976

[54] TRIP LEVER GUARD MEANS FOR REEL SPINNING GAMES

[75] Inventor: Frank G. Nicolaus, Chicago, Ill.

[73] Assignee: Bally Manufacturing Corporation, Chicago, Ill.

[22] Filed: July 16, 1974

[21] Appl. No.: 488,916

[52] U.S. Cl. .................................................. 74/17.5
[51] Int. Cl.² ........................................... F16H 57/06
[58] Field of Search ................................. 74/17.5, 2

[56] References Cited

UNITED STATES PATENTS

| | | | |
|---|---|---|---|
| 860,602 | 7/1907 | Hopkins | 74/17.5 |
| 2,168,552 | 8/1939 | Alexander | 74/17.5 |
| 2,627,752 | 2/1953 | Nicolaus | 74/17.5 |

*Primary Examiner*—Samuel Scott
*Assistant Examiner*—Wesley S. Ratliff, Jr.
*Attorney, Agent, or Firm*—Callard Livingston

[57] ABSTRACT

An auxiliary fraud-deterrent guard method and means for use with handle-operated reel-spinning mechanisms such as poker, fruit and slot machines which employ a trip lever requiring complete, non-retrogressive movement of the operating handle for initiation of a proper operating cycle, wherein retrogression is prevented by a blocking dog which enters behind the advancing trip lever and is automatically displaced to non-obstructing position by the decoupling action of a pawl which frees the trip lever from the handle at trip-out position. An additional feature provides a simple adaptor means mounting the dog for quick installation on existing equipment.

11 Claims, 4 Drawing Figures

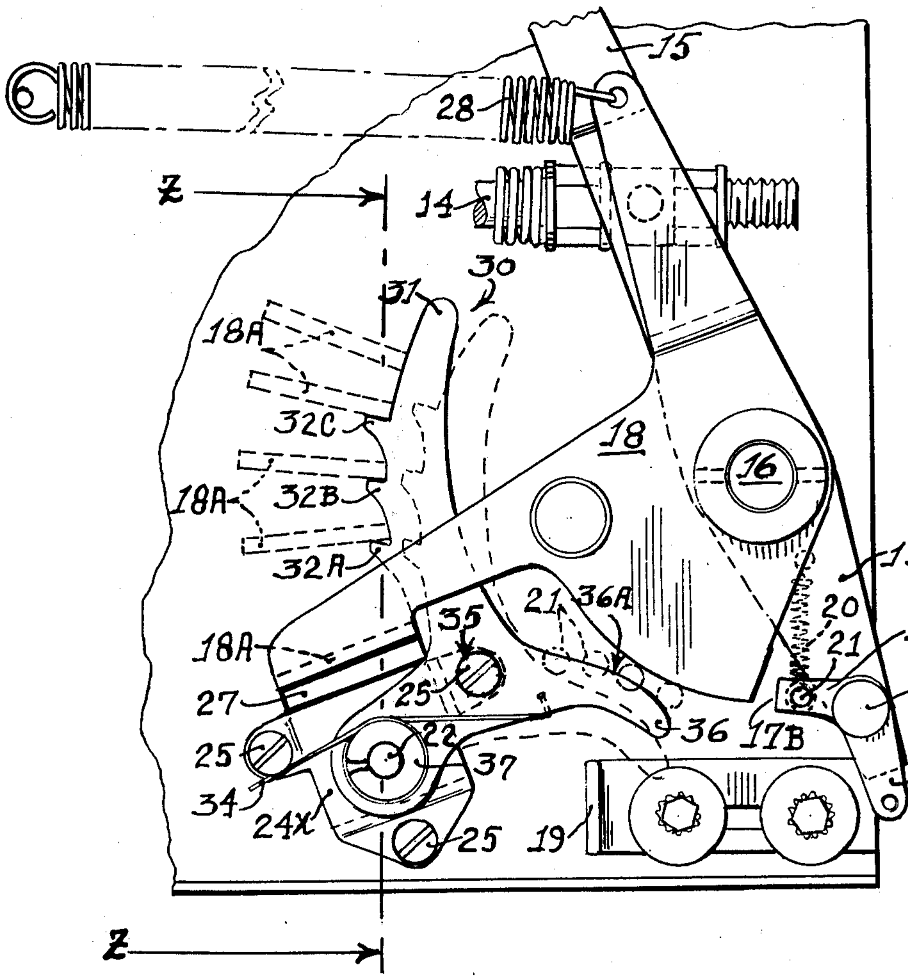
Fig.3.
Fig.4.
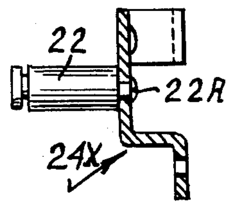

TRIP LEVER GUARD MEANS FOR REEL SPINNING GAMES

In certain known types of coin-released amusement and game apparatus a plurality of symbol-bearing reels will be set into spinning motion to come to rest in various symbol-displaying positions to determine a score or award or other resultant condition. The reel-spinning mechanism is actuated by a handle to initiate a game cycle in a way which requires that the handle be advanced from a starting position without retrogressive movement until it reaches a trip-out position at which it is suddenly disconnected from the spinning mechanism by action of a trip lever serving to disconnect the handle mechanism from a main shaft element which will actuate the indexing means and cause spinning of the reels.

Such reel-spinning mechanisms involve critical cycle-control and timing instrumentalities actuated by a main reel-activating and indexing shaft means responsive to the handle pull which can be permitted no substantial reverse displacement during initial cocking or setting advance toward a trip-out position because, otherwise, the normal reel cycle can be interfered with and possibly restarted or cut short, and because at certain phases of handle and shaft advance a slight back and forth jogging motion of the activating shaft can be contrived to "walk" or tease at least one reel into a changed symbol or score-displaying position.

Handle protective mechanisms have been devised to prevent reverse manipulation of the operating handle; however, newly-contrived assaults on the machines have found ways to disable or neutralize known types of full-stroke and like handle safety means while leaving the handle sufficiently manipulatable to impart necessary jogging and manipulative motions to the reel-activating shaft means to defeat the purposes of the handle-protective arrangements.

According to the guarding method of the invention, blocking means is interposed in the actuating train following the handle mechanism but in advance of the reel-activating shaft whereby interference with the normal mandatory reel-spinning cycle resulting from attempted retrogressive manipulation sought to be transmitted into such shaft is rendered ineffectual by blocking retrogressive movements of an intervening trip-lever coupling means so that both the handle and shaft remain positively unimpeded for movement in the intended directions required for initiation and completion of the normal mandatory cycle as well as in return of these members to starting positions, means suitable for the method including a pivoted blocking dog operation to enter and retrogressively block the trip lever through its normal advancing stroke toward trip-out position, together with means operative as a function of the tripping out of a trip pawl to decouple the reel-activating shaft from the trip lever and therefore from the handle mechanism to forcibly withdraw the blocking dog from any interference with reverse motions of either the trip lever or the actuating shaft at the instant of trip-out.

In accordance with a further feature of the invention, instrumentalities utilized in the practice of the method including particularly a pivotal support means operative to mount the blocking dog in operative relation to existing reel-spinning equipment includes an adaptor which is a modification of an existing trip-lever bumper component in such equipment so contrived that it includes a pivot for the dog and can be quickly and easily installed in operative position in an existing reel machine as a replacement for the original bumper component without the use of special tools or resort to preparatory operations such as hole-drilling and tapping.

More detailed aspects of the disclosures, and construction, operation, advantages and capabilities of the improved methods and structures, will appear from the following description of a preferred embodiment thereof in view of the annexed drawings in which:

FIG. 3 is a fragmentary enlarged detail of the trip lever and guard means;

FIG. 4 is a cross-sectional detail of the adaptor means enabling installation of the guard means in a device of the class described.

Figure 1:
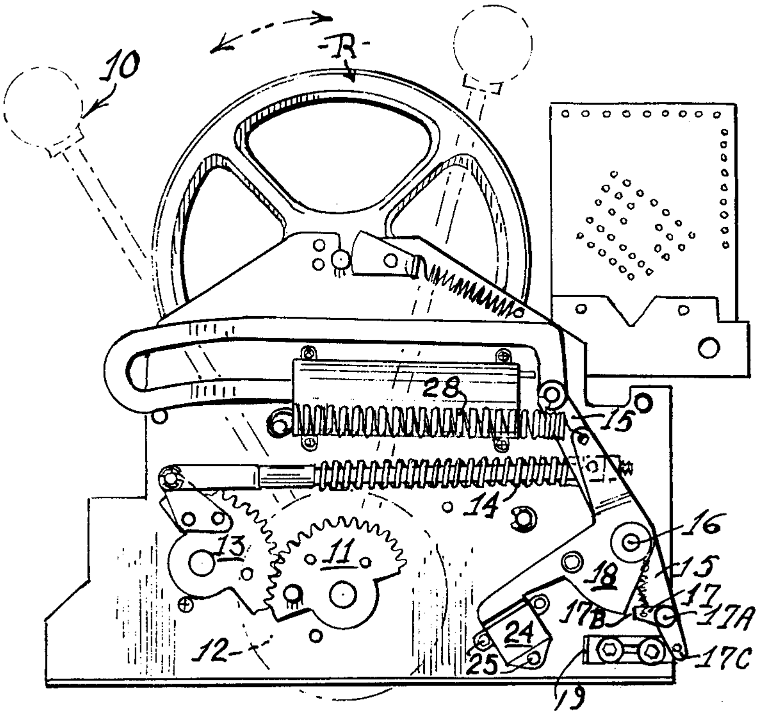
FIG. 1 is a side elevation of a known type of reel-spinning apparatus showing the trip lever in conjunction with the novel guard means.

FIG. 1 illustrates in elevation the right-hand side of a known type of reel-spinning mechanism of the class described wherein a plurality of symbol-bearing reels -R- will be set in motion as the result of counterclockwise advance of the sidemounted operating handle 10, actually situated on the right-hand outer side of the usual locked cabinet which will house the machine (not shown), the movement of which handle from its normal starting position indicated in dotted lines may be transmitted normally through a known form of handle protective mechanism indicated schematically in dotted lines as the unit 12, and thence through a pair of gear segments 11 and 13 and a drive rod 14 to exert an activating thrust on certain drive and trip-lever means to be described.

One known form of the handle-protective mechanism 12 is described in U.S. Pat. No. 2,627,752, with particular reference to FIGS. 3 and 4 and column 4 thereof, according to which there are provided certain electromagnetically controlled handle lockout components and a form of full-stroke dog means 31, 32, 60, arranged to prevent back-stroke movement of the handle as shown in said patent, such protective mechanisms being intended for use with an analogous form of reel-spinning apparatus of the kind shown in U.S. Pat. No. 2,579,241, wherein the handle is located at the front of the machine where it is not as vulnerable to vandalism as the side-mounted type of handle depicted in the illustrative reel apparatus referred to herein.

In the presently described reel apparatus, as the result of initial advance of the handle 10, the thrust of the drive rod 14, FIG. 1, is transmitted by positive connection to a drive lever 15 floating free on a main reel-activating shaft 16 to rock the latter clockwise in an initial spring-tensioning and reel-indexing operation which will turn the shaft 16 through the intermediary of a triggerable intercoupling with a trip lever 18 which is fast on said shaft and is coupled with drive lever 15 by means of a small trip pawl and coupling dog 17 pivoted thereon (FIG. 3 also) which pawl will be automatically tripped out when the trip lever reaches a predetermined position of advance relative to the trip bracket 19.

The trip pawl is pivotally mounted at 17A on the drive lever and urged by a small spring 20 to thrust its nose portion 17B against an edge of the trip lever 18 and thereby apply the thrust of lever 15 against such trip lever to push the latter through its intended clockwise advancing and cocking stroke. One end of the pawl spring is attached to the end of a long pin 21 projecting from the inner side of the pawl (FIG. 3) the opposite end of this spring being anchored into a hole in the lever 15, said pin being utilized for an additional function in the guarding method, as will appear.

The operation of the foregoing known reel-actuating mechanism by the handle 10 in its normal intended cycle will carry the drive lever and therefore the trip pawl clockwise toward the left in FIG. 3 until the tail portion 17C of the pawl abuts the offset end of a trip bracket 19 affixed to the chassis, and slight continuing advance of the drive lever will thereupon cause the trip pawl to pivot relative to levers 15 and 18 and suddenly decouple the same, thereby permitting the now-tensioned main shaft 16 to reverse its direction and set the reels spinning in known manner, with the trip lever 18 meanwhile flying back to its starting position under urgence of a tractile spring 28.

In the normal operation of such a reel-spinning apparatus, handle safety mechanisms such as represented by the unit 12 previously alluded to, have some deterrant effect upon ordinary fraudulent handle manipulation and vandalism; however, extraordinary ways have been devised, usually involving gross force, to disable or neutralize such handle protective devices in a way to permit slight rocking or jogging motions of the handle and consequent transmission of movements to the trip lever 18 necessary either to stop or restart the cycle or walk the reels, etc., for which manipulative purposes it is only necessary that the vandalized handle be left with slight retrogressive (in this instance clockwise) freedom of motion in order to transmit the needed manipulating movements into the drive lever 15 and thence into shaft 16 through trip lever 18, it being observed, however, that retrogressive motion of the trip pawl 17 does not of itself impart any retractive force to lever 18 because the pawl is not positively connected to such lever.

Figure 2:
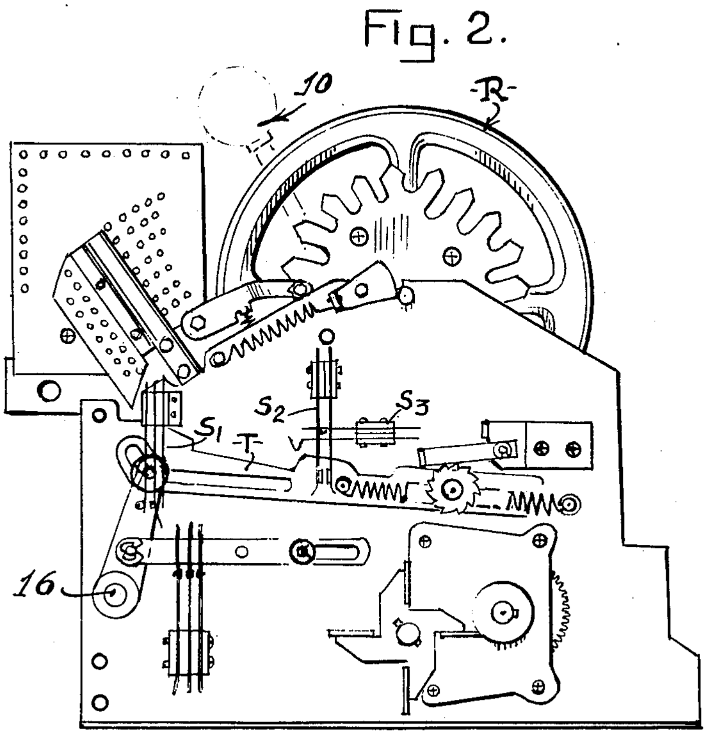
FIG. 2 is an elevational view, to reduced scale, of the side of the apparatus which is opposite to that seen in FIG. 1 and showing certain timing components involved in mandatory reel cycle control functions.

According to the method of the invention, fraudulent manipulation of the handle, without regard to the primary protective means 12, is defeated, notwithstanding possible movement of the drive lever by the handle, by progressively blocking retrogressive movements of the impositively-coupled trip lever itself into which only forward thrusts of the drive lever are transmitted through the coupling pawl means 17, thereby protecting the shaft 16 by preventing retrogressive motion of a member such as lever 18, which has no positive connection with pawl 17 or lever 15, with the ultimate result that the normal reel cycle must either go forward to completion or will not be initiated at all; and even if the trip lever is jogged at one of the critical points of advance position, the possible magnitude of retrograde movement will not permit walking the reels or recycling the machine, or interference with the cycling functions of such critical cycling components as the timer bar -T- and associated control switch means such as switches $S_1$–$S_2$–$S_3$, which depend upon the trip-out rotation of shaft 16 (FIG. 2) since the timing components controlled by shaft 16 will remain in whatever stage of operation the farthest point of advance of the trip lever shall have determined.

In further accordance with the invention, guard instrumentalities in the preferred form and arrangement depicted to enlarged scale in FIG. 3 comprise a blocking dog 30 pivotally mounted on a stud 22 which is staked as at 22A into the face of a modified bumper bracket 24X removably affixed to the chassis by screws 25 and containing a resilient bumper block 27 which is disposed in the path of the laterally-offset anvil or impact wing 18A on the trip lever and serves to arrest the fly-back return motion of the latter after tripping out.

The blocking dog 30 is provided with a first elongated arcuate and somewhat radially-extensive prong 31 along the convex edge of which is a series of teeth 32A, 32B, 32C, each of which is disposed to lie beneath the rearward or radially innermost margin of the laterally-offset impact wing 18A of the trip lever as the latter rises in the critical phases of advance, as indicated by the successive dotted-line positions in FIG. 3, a torsion spring 34 being operative to pivotally urge the dog against the trailing edge of the wing so that the teeth are contrived to follow into the most critical blocking locations along the arc of travel of the trip lever.

To increase the resistance of the dog to attempted retrogressive forcing of the trip lever, the reverse thrust of the latter is met by the dog teeth generally along a line Z—Z extending in approximation radially through the center of the pivot stud 22 in the follow-up movements of the dog under urgence of spring 34, it being desirable for such purposes that the lowermost tooth 32A, which is proximate to the pivot stud in the starting position of the trip lever, shall preferably be given a rake of about 15° in relation to a tooth depth of about 1/16th inch so that in the most vulnerable initial position of the guard dog, grossly forced handle pressure will not tend to cam the dog away from the lever, but rather otherwise; and further, each succeeding tooth in the series will preferably also increase in depth by about 1/32nd inch so that the top tooth in this example would have a depth of about 5/32nds inch, particular magnitudes of rake and depth, however, being empirical in relation to the particular reel mechanism to be guarded, for example, as the method is adapted to one known type of mechanism illustrated herein.

At a position angularly offset from the series of blocking teeth, the guard dog 30 is provided with a second prong configuration constituting a trip prong 36 projecting in a direction generally back toward the main shaft 16 so as to overlie the trigger bracket 19 and present an arcuate camming edge portion 36A for engagement with the long spring pin 21 projecting laterally from the inner side of the trip pawl 17 to which the pawl spring 20 is attached as aforesaid, the opposite end of this spring anchored on the drive lever to urge the pawl counterclockwise for coupling contact with the trip lever in the starting position of the latter, as in FIG. 3, full lines.

The pin 21 projects and advances into the path of the arcuate trip prong 36, as indicated in dotted lines in FIG. 3, so that as the trip and drive levers approach the limit of advance, the tail 17C of the trip pawl first bears against the trip bracket 19 and slight further advance of the trip lever then causes the trip pawl to stand still, relatively, and disengage the trip lever, which tends to continue on, however, thereby suddenly decoupling the drive and trip levers with the dual result that the trip lever flies back toward starting position and the reels are set spinning.

The slight final advance of the trip lever which triggers the trip-out of the pawl, brings the spring anchoring pin 21 on the trip pawl to bear against the camming edge on the arcuate prong 36 of the blocking dog, thereby forcibly rocking the latter clockwise and wholly clear of the return path of the trip lever just prior to the fly-back motion of the latter under urgence of the long spring 28.

A further feature of the guard means is the provision for quick and easy utilization of the interposed guarding method by adaptation of the illustrative dogging instrumentalities to existing reel equipment of the type described and facilitated by substitution of a modified barnacle bumper assembly 24X, as depicted in FIG. 4, wherein the pivot stud 22 is staked as at 22A into the outer wall of the substitute cleat 24X without further change in the latter, and the guard dog 30 is secured on the stud by clip retainer means 37, in consequence of which installation of the auxiliary trip-lever guard means requires no more than removal of the three screws 25 which hold the original bumper cleat, replacing the latter with the stud-bearing modification in assembly with the associated dog and torsion spring means 30, 34, and resetting screws 25. To facilitate such adaptive installation of the modified bumper and pivot stud assembly, an access hole 35 is provided adjacent the hub area of the guard dog to admit a screw driver for setting the correspondingly-located one of the attaching screws 25 which would otherwise lie more or less inaccessibly behind the dog.

In FIG. 3 the trip-lever thrust-line Z—Z tends to be approximately radial to the pivotal axis of the dog at 22, and can be made radial for all blocking teeth if the flyback bumper 27 is positioned accordingly, the approximate radial relation being the result of utilizing an existing bumper construction in the illustrative reel mechanism.

I claim:

1. Trip-lever guard means for reel-spinning mechanism of the type having a trip-lever oscillable between a starting and a trip-out position to initiate an operating cycle of said mechanism, together with a drive lever and cooperative handle means oscillable between limits in each cycle to impart advance to the trip-lever toward and to said trip-out position, and spring means urging the trip-lever back to starting position with triggerable coupling means operative to couple said drive lever with the trip-lever during travel of the latter from starting toward trip-out position and means operative to trigger the coupling means into decoupling action on movement of the trip-lever responsive to a predetermined approach to the trip-out position whereby to permit rapid spring return of the trip-lever to the starting position, said guard means comprising, namely: blocking means spring-urged to thrust behind a part of the trip-lever to prevent retrogressive movement thereof in its position of travel from said starting position to said trip-out position, said blocking means including further means interactive with said coupling means as a function of decoupling action thereof to effect movement of the blocking means out of the path of retrogressive movement of said part of the trip-lever substantially prior to start of the trip-lever back toward starting position.

2. Guard means according to claim 1 wherein said blocking means comprises a dog lever pivotally mounted adjacent the trip-out lever and includes a blocking part disposed to extend into blocking relation to said part of the trip-lever responsive to pivoting of the dog in a certain direction and to withdraw said blocking part from blocking relation to said trip-lever part when the dog is pivoted in the opposite direction, said dog being spring urged as aforesaid by spring means acting constantly to urge the dog in said certain direction.

3. Guard means according to claim 1 wherein said blocking means is a pivoted dog lever provided with spring means urging the same to dispose a blocking part thereof in blocking relation with the part of the trip-lever as set forth in claim 1, and said further interactive means comprises an extension of the dog lever projecting into the path of a part of said coupling means in a manner to be engaged and urged by the latter in decoupling action to pivot the dog in a direction to dispose said blocking part out of blocking relation to the trip-lever whereby the latter will be unimpeded by the guard means for rapid return to starting position as aforesaid.

4. Guard means as set forth in claim 3 further characterized in that said dog lever has a first radial extension constituting said blocking part, and a second radial extension constituting said further interacting means and projecting into a position to be engaged by a part of said coupling means when the trip-lever is substantially approached to the trip-out position and the coupling means is substantially in triggered position for decoupling action as aforesaid.

5. Guard means as set forth in claim 1 further characterized in that said blocking means comprises a pivoted blocking dog provided with pivotal support in the form of a holding member attached to said reel-spinning mechanism at a point adjacent said trip-lever, and said holding member holds a resilient buffer means disposed to be engaged by said trip-lever in said starting position.

6. In a reel-spinning mechanism having an actuating shaft operative to effect spinning of the reels, a trip-lever fast on said shaft, a drive lever floating on said shaft and provided with triggerable coupling means coupling and decoupling the same with said trip-lever for advance movement of the latter therewith from a starting into a trip-out position, spring means urging the trip-lever back to starting position, and trigger means operative to cause decoupling action of the coupling means as the consequence of movement of the trip-lever substantially into trip-out position, improvements in trip-lever guard means for preventing reverse movement of the trip-lever toward starting position during advance toward trip-out position, said guard means comprising: a blocking member and means mounting the same for turning movement radially outward of said trip-lever in said advance thereof, and spring means yieldingly urging the blocking member radially outward thereof against the trip-lever for the purpose aforesaid, said blocking member being movable angularly against the action of said spring means into a non-blocking angular displacement radially inward of the trip lever axis to permit reverse movement of the trip-lever back to starting position; said blocking member and coupling means being constructed and disposed for interacting engagement to cause angular movement of the blocking member in said non-blocking displacement responsive to a decoupling movement of said coupling means.

7. A method of guarding reel-spinning mechanism having a predetermined mandatory operating cycle initiated by operation of a manual operating lever drivingly coupled with and decoupled from a reel-spinning mechanism by a trip-lever which must move in each cycle from a starting to a trip-out position and rapidly back to starting position under control of trigger-released coupling and decoupling means, whereby to prevent undesired interference with the normal intended operation and completion of such operating cycle by unintended manipulation of the operating lever for the purpose of transmitting retrogressive movements into the trip-lever and associated reel-activating components, which method comprises, namely: causing a blocking means to follow the trip-lever in retrogression-blocking relation to said lever substantially throughout its travel as it progresses in advance from said starting position toward said trip-out position, and then substantially as the trip-out position is reached, applying a displacing force to such blocking means from the trigger-released means as a function of decoupling action of the latter and operative to displace the blocking means from blocking relation with the trip-lever and thereby permit intended and unimpeded full retrogressive movement of the trip-lever for rapid return to said starting position.

8. The method of claim 1 wherein the trip-lever pivots with a reel-spinning drive shaft and the intended retrogressive movement of said trip-lever back to starting position is arrested by resilient buffer means disposed in predetermined proximity to said starting position, and wherein said blocking means is a blocking dog supported by pivot means carried by a part of said buffer means, and the blocking means is spring-urged to turn behind a radially-offset part of the trip-lever during advance thereof as aforesaid, which offset part impinges upon said buffer means substantially concommitantly with arrival of the trip-lever at said starting position.

9. In apparatus of the class described, having a known type of pivoted trip-lever movable from a starting to a trip-out position and drive lever means for moving the trip-lever as aforesaid, together with triggerable means movable with said drive lever means for coupling the latter with the trip-lever and triggering means operative to trigger the triggerable means substantially on arrival of the trip-lever at said trip-out position whereby to free the trip-lever for flyback action to said starting position; the combination of improved guard means operative to prevent retrogressive movement of the trip-lever in travel between said starting and trip-out positions and comprising a pivoted dog having an arcuate portion which is spring-urged into engagement with an offset portion of the trip-lever which is radially remote from its pivot axis, said arcuate portion of the dog having at least one blocking tooth portion to engage behind the trip-lever at said offset portion in a manner such that the retrogressive thrust of the trip-lever thereagainst lies along a line of thrust which is approximately radial to the pivotal axis of the dog whereby to direct forces acting in a direction to throw the dog away from the trip-lever, responsive to retrogressive thrust of the latter lever, in a way to lessen the thrust of such forces, said dog having a release projection disposed to move into juxtaposition with said triggerable means substantially at the time of triggering action thereof for coaction therewith in a manner such that a resultant force is caused to act on the dog to displace the dog out of blocking relation with the trip-lever and wholly out of the return path thereof so as not to impede the flyback action thereof to starting position when tripped out.

10. The combination according to claim 9 further characterized in that said arcuate portion of the dog extends in a sense approximately radially of the pivot axis thereof and is provided with a plurality of blocking teeth operative to block retrogressive motion of the trip-lever as aforesaid, there being at least one such tooth closer to the pivot axis of the dog than the others which is pitched in a direction to accentuate the diversion of retrogressive thrust of the trip-lever in a sense toward the pivotal axis of the dog as aforesaid, whereby to cause such retrogressive thrust on the dog to act more nearly along a line radial to the pivotal axis of the dog for the purpose set forth.

11. The combination of claim 9 wherein said guard means is further characterized in that said release projection of the dog coacts with said triggerable means in a manner to cause the dog to move angularly away from the offset portion of the trip-lever and toward the pivotal axis of said lever.

* * * * *